3,266,852
CONTROL VALVE
Richard C. Bueler, Glendale, Mo., assignor to Wagner Electric Corporation, St. Louis, Mo., a corporation of Delaware
Filed Jan. 17, 1964, Ser. No. 338,368
13 Claims. (Cl. 303—54)

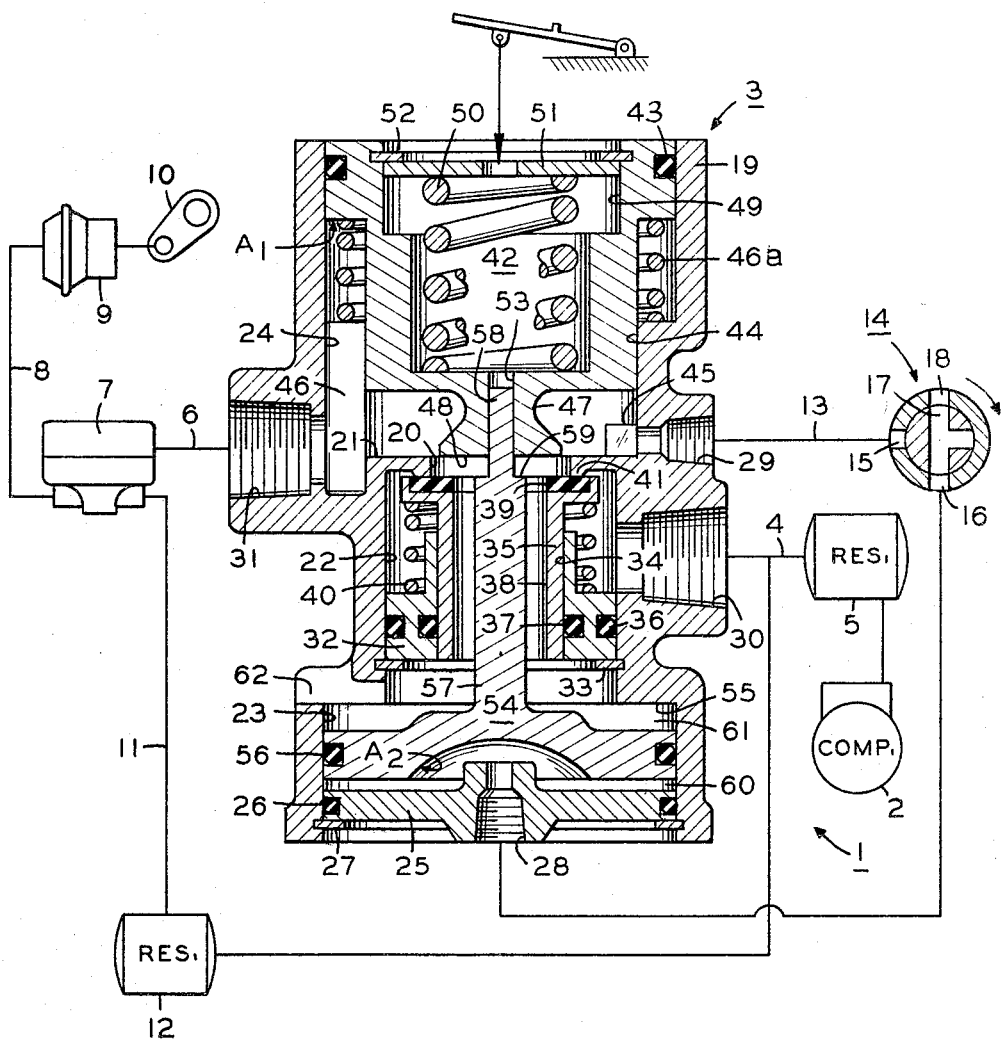

This invention relates to application valves for fluid pressure systems and in particular to ratio-changing application valves.

In the past, disadvantageous features effecting undesirable increases in vehicle air brake system sensitivity which, in most instances, deleteriously affected desirable air brake system controllability, i.e., the vehicle operator's ability to control the application valve treadle position and/or application treadle force, have been a subject of interest and concern since precise braking controllability is essential to safe vehicle operation, and on larger commercial vehicles, such as tractors and/or trailers for instance, undesirable increases in sensitivity acutely affected braking controllability when such vehicles were operated substantially empty or without load. For example, the foundation brakes for such larger vehicles were necessarily designed to have a braking capacity great enough to adequately meet maximum braking demands or requirements when said vehicle was subjected to maximum loads, and as a resulting disadvantageous feature, said vehicle was greatly overbraked when empty or subjected to minimum loads which served to increase braking sensitivity and decrease braking controllability. Similarly, the suspension systems for such larger vehicles were necessarily designed to provide a satisfactory vehicle ride when subjected to maximum vehicle loads, and as another resulting disadvantageous feature, a rather stiff or sharp vehicle ride was provide in response to minimum vehicle loads which also tended to increase braking sensitivity and decrease braking controllability. In a large measure, the aforementioned disadvantageous features inherent to brake design and suspension design for larger vehicles were, in combination, responsible for the undesirable variations in braking controllability experienced as vehicle loads increased or decreased.

The past air application valves were generally designed to provide maximum performance for the vehicle operator at maximum vehicle loads which effected both maximum braking sensitivity and maximum braking controllability, and as a resulting disadvantageous feature, the performance of such application valves decreased in response to minimum vehicle loads. In other words, the disadvantageous features of braking design and suspension design, i.e., overbraking and stiff riding, contributed to braking sensitivity with a resulting decrease in braking controllability in response to minimum vehicle loads or braking loads to amplify or supplement the disadvantageous feature of the application valves, i.e., poorer or decreased performance. Increased braking sensitivity generally served to seriously impair the vehicle operator's ability to exercise the necessary precise control on the application valve and, therefore, decreased braking controllability or erratic vehicle braking resulted. In other words, as the vehicle or braking load decreased, the corresponding braking pressure required to effect proper or desirable vehicle deceleration and/or a complete stop also decreased, and the vehicle operator's ability to immediately adapt or adjust to the reduced application valve treadle reaction force accompanying such reduced braking pressure was generally insufficient to provide continuous and effective braking controllability and to prevent "overshooting" or applying more braking pressure than necessary to effect such desired vehicle deceleration. In this manner, increased braking sensitivity with a corresponding decreased braking controllability effected by the disadvantageous features of brake and suspension designs at minimum vehicle loads amplified or supplemented the disadvantageous feature of reduced application valve performance at minimum vehicle loads to accentuate the vehicle operator's inability to adjust to such conditions whereby any "overshooting" unintentionally effected by the vehicle operator served to immediately lock the vehicle brakes resulting in undesirable vehicle skidding and/or vehicle hopping.

Also in the past, application valves were employed in air brake systems in conjunction with ratio-relay valves, and an operator applied treadle force on said application valve metered fluid pressure from a source thereof to actuate said ratio-relay valve. The ratio-relay valve was responsive to the metered fluid pressure to apply fluid pressure from the aforementioned source or an auxiliary source to actuate a fluid pressure responsive motor for controlling energization of the vehicle brakes. Further, the ratio-relay valve was selectively operable to apply fluid pressure to the motor in a direct proportion or a ratio proportion to that metered thereto from the application valve. Another disadvantageous feature was that the operator was afforded a direct feel through the application valve only of the fluid pressure metered to the ratio-relay valve and was not necessarily afforded a direct feel as to the extent of the actual braking application. For instance, if the ratio-relay valve was selectively positioned to effect a ratio braking application, the operator could only feel the metered fluid pressure through the application valve while the fluid pressure actually applied by the ratio-relay valve to effect the braking application was less than the magnitude of the metered fluid pressure. Still another disadvantageous feature was that the applied fluid pressure from the ratio-relay valve could never attain the maximum value of the source connected therewith even though the operator metered full reservoir or source fluid pressure through the application valve to said ratio-relay valve when said ratio-relay valve was selectively positioned for a ratio braking application. For instance, under emergency conditions, it was instinctive for the operator to meter or dump full source fluid pressure to the ratio-relay valve, and if the operator had forgotten that the ratio-relay valve was selectively positioned for a ratio braking application, then the actual applied fluid pressure from said ratio-relay valve could never attain the magnitude of the fluid pressure metered to said ratio-relay valve from said application valve.

An object of the present invention is to provide an application valve which overcomes the aforementioned disadvantageous features.

Another object of the present invention is to provide an application valve in which the performance thereof is adjustable to minimize increased braking sensitivity and decrease braking controllability effected by the undesirable features of vehicle brake and suspension design.

Another object of the present invention is to provide an application valve having satisfactory operating characteristics to provide good braking sensitivity and controllability under both loaded and unloaded vehicle conditions.

Another object of the present invention is to provide an application valve in a vehicle fluid pressure system which is at all times operable to effect maximum energization of the vehicle brakes in accordance with the available maximum fluid pressure of said system.

Another object of the present invention is to provide a unitary application valve of compact and simplified construction which compatibly combines the application and ratio changing features or characteristics of separate application and ratio changing valves.

Another object of the present invention is to provide an application valve for a fluid pressure system which compatibly combines the application and ratio changing features or characteristics of separate application and ratio changing valves without appreciably increasing the inherent time lag of said system.

Still another object of the present invention is to provide a ratio changing application valve for a vehicle fluid pressure system which is responsive to selectively operable means to provide both a full or non-ratio braking effect and a reduced or ratio braking effect.

Still another object of the present invention is to provide a ratio changing application valve in which a direct feel or appraisal as to the extent of the braking application is afforded the operator during a full or non-ratio braking application and also during a reduced or ratio braking application.

These and other objects and advantages will become apparent hereinafter.

Briefly, the invention comprises an application valve for a fluid pressure system including application means movable in response to an applied force thereon to establish an output fluid pressure, the magnitude of the output fluid pressure acting on said application means in opposition to the applied force, and other means selectively responsive to either the output fluid pressure or the atmosphere, said other means being movable into engagement with said application means in response to the output fluid pressure acting thereon to further oppose the applied force and alter the magnitude of the output fluid pressure.

The invention also consists in the parts and arrangement and combination of parts hereinafter described and claimed in the following specification, reference being had to the accompanying drawing which forms a part of the specification and wherein like numerals refer to like parts wherever they occur.

In the drawing, a diagrammatic view of a fluid pressure system is shown having an application valve therein embodying the present invention.

Referring now to the drawing in detail, a fluid pressure system 1 is provided with a compressor 2 which is connected to an inlet port of a control or application valve 3 by a conduit 4 having a reservoir 5 interposed therein, said compressor and reservoir defining, in combination, a source of fluid pressure. Another conduit or service line 6 is interposed between an outlet port of the application valve and the control port or portion of a relay valve 7 of the usual self-lapping type well known in the art and effective to apply fluid pressure in substantially a direct proportion, i.e., 1:1, to that metered thereto, and another conduit 8 is connected between the outlet port or portion of said relay valve and a fluid pressure responsive motor or brake chamber 9 which is operatively linked with a slack adjuster 10 for controlling energization of a friction device or wheel brake assembly (not shown). The inlet port or portion of the relay valve 7 is connected with the reservoir 5 by a conduit 11, and another reservoir, such as an auxiliary reservoir 12, is interposed therein. To complete the system 1, another conduit 13 is interposed between a pair of ratio ports provided in the application valve 3, and a two-way hand or ratio valve 14 is provided with connecting ports 15, 16 serially connected in the conduit 13. Rotatable passage means 17 is provided in the hand valve 14 to interrupt pressure fluid communication betwen the connecting ports 15, 16 while venting one of said connecting ports to the atmosphere through an exhaust 18; however, said passage means may be rotated clockwise (in the direction of the arrow) to a position in alignment between the connecting ports 15, 16 thereby providing pressure fluid communication between the connecting ports of the application valve 3.

The application valve 3 is provided with a housing 19 having a bore 20 therein defining an annular housing wall 21 and interconnected between stepped intermediate and lower counterbores 22, 23 and an upper counterbore 24, said intermediate counterbore 22 defining an inlet chamber. A closure member 25 is retained against displacement from the lower counterbore 23 by a groove and snap ring assembly 27 provided adjacent to the lower end of said lower counterbore, and a seal 26 is carried by said closure member in sealing engagement with said lower counterbore. A connecting port 28 which receives one end of the conduit 13, as previously mentioned, is provided through said closure member, and another connecting port 29 which receives the other end of the conduit 13, as previously mentioned, is provided in the housing 19 intersecting the upper counterbore 24 adjacent to the housing wall 21. An inlet port 30 which receives the conduit 4, as previously mentioned, is provided in the housing 19 intersecting the inlet chamber 22 near the mid-portion thereof, and an outlet port 31 which receives the conduit 6, as previously mentioned, is also provided in the housing 19 intersecting the upper counterbore 24 adjacent to the housing wall 21.

A valve guide member 32 is positioned against displacement from the inlet chamber 22 by a snap ring and groove assembly 33 provided adjacent the lower end of said inlet chamber. The valve guide member 32 is provided with an axial bore 34 therethrough in which a valve element 35 is slidably received, and seals 36, 37 are carried in said valve guide member in sealing engagement with said valve element and the intermediate counterbore 22. The valve element 35 is provided with an axial bore or exhaust opening 38 therethrough, and an annular seal or disc 39 is carried on the upper end of said valve element in circumscribing relation with said exhaust opening. A valve return spring 40 is biased between the valve element 35 and the valve guide member 32 normally urging the valve seal 39 into sealing engagement with a valve seat 41 which is formed on the housing wall 21 at the juncture of the bore 20 and intermediate counterbore 22.

An application member or a reaction piston 42 is slidably received in the upper counterbore 24 having a peripheral seal 43 in sealing engagement with said upper counterbore, and the housing 19 is provided with integrally formed guide means 44 in said upper counterbore for said reaction piston and a stop 45 for said reaction piston integrally formed adjacent the lower end of said upper counterbore. An outlet chamber 46 is defined in the upper counterbore 24 between the reaction piston 42 and the housing wall 21 in open pressure fluid communication with the outlet port 31 and the connection port 29, and the reaction piston 42 is provided with an effective cross-sectional area or reaction area $A_1$ in said outlet chamber 46. A return spring 46a is interposed between the reaction piston 42 and the housing guides 44 normally urging said reaction piston to its inoperative position. The reaction piston 42 is provided with an integral extension 47 for movement through the housing bore 20, and a valve seat 48 is provided on the free end of said extension for engagement with the valve element 35, said valve seat being normally maintained in predetermined spaced relation from said valve element by the compressive force of the return spring 46a. The reaction piston 42 is also provided with a stepped metering spring bore 49, and a precompressed metering spring 50 is contained therein by a treadle force receiving member or abutment plate 51 which is slidable in said metering spring bore. The treadle force receiving member is slidably retained in the metering spring bore 49 against displacement by a snap ring and groove assembly 52 provided adjacent the upper end of said metering spring bore, and the reaction piston extension 47 is provided with a centrally located bore 53 extending therethrough and substantially coaxial with the lower end of said metering spring bore.

Another application member or ratio piston 54 is slidably received in the lower couterbore 23 between the closure member 25 and a stop 55 integrally provided on the housing 19 at the juncture of the intermediate and lower counterbores 22, 23, and a peripheral seal 56 is carried by said ratio piston in sealing engagement with the side wall of said lower counterbore. An extension or stem 57 is integrally formed on the ratio piston 54 and extends coaxially through the exhaust opening 38 of the valve member 35 having a free end portion 58 slidably received in the bore 53 of the reaction piston extension 47. A shoulder or radial abutment surface 59 is provided on the ratio piston stem 57 adjacent to the free end portion 58 thereof for engagement with the lower reaction piston end or valve seat 48, as will be described hereinafter. An expansible ratio chamber 60 is defined in the lower counterbore 23 between the ratio piston 54 and the closure member 25 in open pressure fluid communication with the connection port 28 in said closure member at all times, and said ratio piston also defines an exhaust chamber 61 in said lower counterbore communicating the exhaust opening 38 of the valve element 35 with an exhaust port 62 provided in the housing 19 and intersecting said lower counterbore adjacent to the upper end thereof. To complete the description of the application valve 3, the ratio piston 54 is provided with an effective cross-sectional area $A_2$ in the ratio chamber 60 which is additive to the reaction area $A_1$ of the reaction piston 42.

In the operation, assume that the component parts of the application valve 3 are positioned as above described and that the rotatable passage means 17 of the ratio valve 14 is positioned between the connecting and exhaust ports 16 and 18 connecting the ratio chamber 60 of said application valve to atmosphere to effect a full or non-ratio braking application, such as for instance, when the vehicle is subjected to maximum load conditions. A manually applied force M by the operator on the force receiving plate 51 of the reaction piston 42 moves said reaction piston downwardly in the upper counterbore 24 against the return spring 46a to sealably engage the extension valve seat 48 with the valve element 35 thereby closing the valve element exhaust opening 38 and isolating the outlet chamber 46 from the atmosphere. Further downward movement of the reaction piston 42 disengages the valve element 35 from the housing valve seat 41 on the housing wall 21 to establish pressure fluid communication between the inlet and outlet ports 30 and 31. The established or output fluid pressure P flows from the reservoir 5 through the conduit 4, the inlet port 30, the inlet chamber 22, the housing bore 20 and the outlet chamber 46 into the outlet port 31 and therefrom through the service line 6 into the control portion of the relay valve 7 to controllably effect actuation thereof. The relay valve 7 is responsive to the fluid pressure P metered thereto from the application valve 3 to effect the application of fluid pressure from the auxiliary reservoir 12 through the conduit 11 to the conduit 8 to actuate the brake chamber 9 which, in turn, rotates the slack adjuster 10 to energize the wheel brake assembly associated therewith (not shown). As previously noted, the relay valve 7 is of the self-lapping type well known to the art wherein the magnitude of the fluid pressure applied therefrom to the brake chamber 9 is substantially equal to the fluid pressure P controllably metered thereto by the application valve 3. The fluid pressure P so established in the outlet chamber 46 acts on the effective area $A_1$ of the reaction piston 42 creating a reaction force F substantially equal to and in opposition to the manually applied force M on said reaction piston, i.e., $M=F=PA_1$.

When the reaction force F equals the manually applied force M, the reaction piston 42 is moved upwardly against the metering spring 50 wherein the valve element 35 is positioned in lapped engagement with the housing valve seat 41 and the extension valve seat 48 is positioned in lapped engagement with said valve element. The reaction F acting through the metering spring 50 against the manually applied force M on the plate 51 affords the operator a direct and accurate "feel" as to the extent of the braking effort or application. If a greater braking effort is desired, the manually applied force M is increased, and the component parts of the application valve 3 and system 1 function in the same manner as previously described to again move the component parts of said application valve to their lapped positions.

When the desired braking effort is attained, the manually applied force M is removed from the reaction piston 42, and the return spring 46a and the reaction force F moves said reaction piston upwardly to its original or inoperative position. Since the valve element 35 is sealably engaged with the housing valve seat 41 to interrupt pressure fluid communication between the inlet and outlet ports 30 and 31, the aforementioned upward movement of the reaction piston 42 disengages the extension valve seat 48 from said valve element to re-establish communication between the outlet and exhaust ports 31 and 62 to exhaust the fluid pressure P from the control portion of the relay valve 7 through the service line 6, the outlet port 31, the outlet chamber 46, the housing bore 20, the valve element exhaust opening 38, the exhaust chamber 61 and said exhaust port to the atmosphere. The relay valve 7 is responsive to said pressure fluid exhaustion to again interrupt pressure fluid communication between the reservoir 12 and brake chamber 9 and vent the applied fluid pressure from said brake chamber through the conduit 8 to atmosphere thereby de-actuating said brake chamber and effecting de-energization of the wheel brake assembly associated therewith. In this manner, exhaustion of the fluid pressure P from the outlet chamber 46 of the application valve 3 eliminates the reaction force F.

If the operator desires a reduced or ratio braking application, such as for instance, when the vehicle is subjected to minimum load conditions or is running empty, the operator rotates the rotatable passage means 17 of the hand valve 14 in a clockwise direction (as indicated by the directional arrow) to a position aligned between the hand valve connecting ports 15, 16. Such repositioning of the passage means 17 interrupts pressure fluid communication between the ratio chamber 60 of the application valve 3 and the atmosphere through the hand valve connecting and exhaust ports 16 and 18 and establishes pressure fluid communication between the outlet and ratio chambers 46 and 60 of said application valve through the ratio ports 28, 29 and the conduit 13. A manually applied force $M_r$ by the operator on the reaction piston 42 actuates the valve element 35 to meter an established or output fluid pressure $P_r$ to the relay valve 7 which, in turn, applies fluid pressure to actuate the brake chamber 9, as previously described. Since the outlet chamber 46 is connected in pressure fluid communication with the ratio chamber 60 during a ratio braking application, as previously mentioned, the output fluid pressure $P_r$ also flows from the outlet chamber 46 through the ratio port 29, the conduit 13, the connecting ports and passage means 15, 16 and 17 of the hand valve 14 into the ratio port 28 and therefrom into the ratio chamber 60. The fluid pressure $P_r$ in the ratio chamber 60 acts on the effective area $A_2$ of the ratio piston 54 to move said ratio piston upwardly in the lower counterbore 23, and this upward movement engages the abutment surface 59 on the ratio piston extension 57 with the lower end 48 of the reaction piston extension 47. In this manner, the fluid pressure $P_r$ in the ratio chamber 60 acting on the effective area $A_2$ of the ratio piston 54 is additive to or supplements the fluid pressure $P_r$ in the outlet chamber 46 acting on the effective area $A_1$ of the reaction piston to create a reaction force $F_r$ in opposition to the manually applied force $M_r$ on said reaction piston, i.e., $M_r=F_r=P_r(A_1+A_2)$. Of course, the reaction force $F_r$ also acts through the spring 50 against the manually applied force on the plate 51 to afford the operator a direct and increased "feel" as to the extent of the ratio braking effort. It should be noted that the output fluid pressure $P_r$ is less than the output fluid pressure P and in ratio therewith by the proportion of the reaction areas:

$$\frac{A_1}{A_1+A_2}$$

From the foregoing, it is apparent that the application valve 3 affords the operator a direct and accurate appraisal or feel as to the extent of both the ratio and non-ratio braking applications. In other words, the output fluid pressures P and $P_r$ act on the effective areas $A_1$ and $A_1+A_2$ of the reaction and ratio pistons 42 and 60 to create reaction forces F and $F_r$ in direct opposition to the applied forces M and $M_r$ on said reaction piston, respectively.

It is apparent that the application valve 3 provides the operator with a greater treadle stroke while also providing an increased reaction area to enhance the performance characteristics thereof for controlling relatively small output fluid pressures $P_r$ during a ratio braking application when the vehicle is running empty or subjected to minimum load conditions which counteracts the increased sensitivity of the braking system normally effected by overbraking and stiff riding conditions inherent at such minimum vehicle load conditions.

It is also apparent that the operator can apply full reservoir pressure to the brake chamber 9 even though the hand valve 14 is positioned for a ratio braking application. For instance, in the event the operator encounters a driving or roadway situation necessitating an emergency or full braking application when the hand valve 14 is in the ratio position, full tank pressure can be applied from the application valve 3 to the relay valve 7 by merely increasing the manually applied force $M_r$. In this manner, the ratio changing feature incorporated in the construction of the application valve 3 obviates the possibility of the operator being unable to attain an output fluid pressure $P_r$ having a magnitude substantially equal to that available in the reservoir. From the above, it is also apparent that the application valve 3 compatibly combines the application and ratio changing features or characteristics of separate application and ratio changing valves, and further, the incorporation of such features into a unitary construction obviates the inherent time lag in the system 1 which would be encountered if separate application and ratio changing valves were utilized.

It is now apparent that a novel system and application valve meeting the objects and advantages set out hereinbefore are provided and that changes and modifications to the precise configurations, shapes and details set forth in the disclosure by way of illustration may be made by those skilled in the art without departing from the spirit of the invention as defined by the claims which follow.

The embodiments of the invention in which an exclusive property or privilege is claimed are defined as follows:

1. In a fluid pressure system having a source of fluid pressure and a fluid pressure responsive motor, a control valve comprising a housing, means within said housing including manually operated application means providing a pressure fluid flow passage between said source and motor, valve means normally urged to a closed position in said flow passage to interrupt pressure fluid flow therethrough, said application means being movable in response to a manually applied force thereon to engage and move said valve means to an open position in said flow passage to effect the application of pressure fluid flow therethrough from said source to said motor, other means adapted for engagement with said application means and defining with said housing an expansible chamber, and selectively operable means for connecting the pressure fluid flow to said motor with said chamber, said other means being movable in response to fluid pressure in said chamber into engagement with said application means to oppose the manually applied force thereon.

2. An application valve for fluid pressure comprising a housing having inlet and outlet ports therein, valve means controlling pressure fluid communication between said ports, valve control means movable in said housing for engagement with said valve means, said valve control means being movable in response to an applied force thereon to engage and move said valve means to a position establishing pressure fluid communication between said inlet and outlet ports, and other means adapted for engagement with said valve control means and defining with said housing an expansible chamber for selective subjection to the established fluid pressure at said outlet port, said other means being movable into engagement with said valve control means to oppose the applied force movement thereof when said chamber is subjected to the established fluid pressure at said outlet port.

3. A control valve for fluid pressure comprising a housing having inlet, outlet and exhaust ports therein, valve means normally urged to a position interrupting pressure fluid communication between said inlet and outlet ports and establishing pressure fluid communication between said outlet and exhaust ports, valve control means movable in said housing for engagement with said valve means, said valve control means being movable in response to an applied force thereon into engagement with said valve means to initially interrupt pressure fluid communication between said outlet and exhaust ports and thereafter move said valve means to a position establishing pressure fluid communication between said inlet and outlet ports, other means having a lost motion connection with said valve control means and defining with said housing an expansible pressure fluid chamber for selective subjection with the established fluid pressure at said outlet port or the atmosphere, said other means being movable to effect the lost motion connection with said valve control means upon the subjection of said chamber to the established fluid pressure at said outlet port and thereafter oppose the applied force movement of said valve control means.

4. A control valve for fluid pressure comprising a housing having interconnected inlet and outlet chambers, valve means controlling pressure fluid communication between said chambers and normally communicating said outlet chamber to the atmosphere, valve control means movable in said outlet chamber for engagement with said valve means, said valve control means being movable in response to an applied force thereon to engage and move said valve means to a position interrupting communication between said outlet chamber and the atmosphere and establishing pressure fluid communication between said chambers, other means in said housing for movement into engagement with said valve control means and defining with said housing an expansible ratio chamber for selective subjection to the established fluid pressure in said outlet chamber, said other means being movable in response to fluid pressure in said ratio chamber into engagement with said valve control means to oppose the applied force thereon upon the subjection of said ratio chamber to the established fluid pressure in said outlet chamber.

5. A control valve for fluid pressure comprising a housing, a bore in said housing axially aligned between a first counterbore and stepped second and third counterbores, a first valve seat in said second counterbore in circumscribing relation with said bore, valve guide means sealably engaged between said second and third counterbores, a valve bore extending through said valve guide means between said second and third counterbores, valve means slidable in said valve bore and normally urged into sealing engagement with said first valve seat, an inlet port in said housing connected with said second counterbore and an outlet port in said housing connected with said first counterbore, closure means connected with said housing and closing the open end of said third counterbore, a first piston slidable in said third counterbore and defining with said closure member an expansible chamber adjacent to one face of said first piston, a first connecting port in said closure member in open pressure fluid communication with said expansible chamber, an exhaust chamber in said third counterbore adjacent to the opposed face of said first piston, an exhaust port in said housing in open pressure fluid communication with said exhaust chamber, an axial exhaust opening extending through said valve means normally connecting said bore and first counterbore in pressure fluid communication with said exhaust chamber, a second connecting port in said housing connected with said first counterbore and in open pressure fluid communication with said outlet port, a manually controlled second piston slidable in said first counterbore and having extension means thereon for movement through said bore, a second valve seat on said extension means for engagement with said valve means about said exhaust opening, a stem extending coaxially through said valve means exhaust opening and having one end thereof connected with said first piston, an abutment surface for engagement with said extension means on the other end of said stem and axially spaced from said extension means, said second piston being initially movable in response to a manually applied force thereon to engage said second valve seat with said valve means closing said exhaust opening and subsequently movable to disengage said valve means from said first valve seat to establish pressure fluid communication between said inlet and outlet ports, and means connected between said first and second connecting ports including selectively operable means movable between one position venting said expansible chamber to the atmosphere and another position providing passage for the established fluid pressure at said outlet port into said expansible chamber, said first piston being responsive to fluid pressure in said expansible chamber to move the abutment surface of said stem into engagement with the extension means of said second piston to thereafter oppose the manually applied force on said second piston when said selectively operable means is in the other position.

6. The control valve according to claim 2, comprising a lost motion connection between said valve control means and said other means, said other means being movable into engagement with said valve control means to effect the lost motion connection therebetween.

7. The control valve according to claim 2, wherein said other means includes extension means having an abutment surface thereon for engagement with said valve control means.

8. The control valve according to claim 7, comprising an exhaust opening in said valve means normally venting said outlet port to the atmosphere, said exhaust opening being closed upon the engagement of said valve control means with said valve means, and said extension means extending through said exhaust opening.

9. The control valve according to claim 2, comprising a pair of additive effective areas on said valve control means and said other means, said areas being respectively responsive to the established fluid pressure at said outlet port and in said chamber to establish a reaction force in opposition to the applied force.

10. The control valve according to claim 2, comprising means connected between said outlet port and said chamber including selectively operable means movable between one position for subjecting said chamber to the established fluid pressure at said outlet port and another position for venting said chamber to the atmosphere, the magnitude of the established fluid pressure at said outlet port acting on only said valve control means in op-position to the applied force when said selectively operable means is in its other position being in a predetermined ratio with the magnitude of the established fluid pressure at said outlet port and in said chamber acting on both said valve control means and said other means in opposition to the applied force when said selectively operable means is in the one position thereof.

11. The control valve according to claim 4, comprising selectively operable means for selectively connecting said ratio chamber in pressure fluid communication with said outlet chamber and for venting said ratio chamber to the atmosphere, the magnitude of the established fluid pressure in said outlet chamber acting only on said valve control means in opposition to the applied force when said ratio chamber is vented to atmosphere being in a predetermined ratio with the magnitude of the established fluid pressure in said outlet and ratio chambers acting on both said valve control means and said other means in opposition to the applied force when said outlet and ratio chambers are connected in pressure fluid communication.

12. A control valve comprising a housing having a pressure fluid flow passage therethrough, application means movable in said housing and controlling pressure fluid flow through said flow passage, said application means being movable in response to an applied force thereon to effect the application of fluid pressure through said flow passage, and other means movable in said housing for engagement with said application means and defining with said housing an expansible chamber, and selectively operable means for connecting said chamber in pressure fluid communication with the applied fluid pressure in said flow passage, said other means being movable into engagement with said application means to oppose the applied force movement thereof only in response to fluid pressure in said chamber when said selectively operable means connects said chamber in pressure fluid communication with the applied fluid pressure in said flow passage.

13. A control valve comprising a housing having inlet and outlet ports therein, a valve seat on said housing between said inlet and outlet ports, valve means normally urged into engagement with said valve seat to interrupt pressure fluid communication between said inlet and outlet ports, a valve control member movable in said housing for operative engagement with said valve means, said valve control member being movable in response to an applied force to engage and move said valve means to a position disengaged from said valve seat establishing pressure fluid communication between said inlet and outlet ports, other means movable in said housing and defining therewith an expansible fluid pressure chamber, a lost motion connection between said other means and said valve control member, and selectively operable means for connecting said chamber in pressure fluid communication with said outlet port, said other means being movable in response to fluid pressure in said chamber when said selectively operable means connects said chamber with the established fluid pressure at said outlet port into lost motion engagement with said valve control member in opposition to the applied force movement thereof.

References Cited by the Examiner

UNITED STATES PATENTS

| 1,626,607 | 5/1927 | Fowler | 91—434 |
| 2,137,954 | 11/1938 | Sanford et al. | 91—434 |
| 3,076,441 | 2/1963 | Ayers | 91—43 X |

MARTIN P. SCHWADRON, *Primary Examiner.*

SAMUEL LEVINE, *Examiner.*

P. E. MASLOUSKY, *Assistant Examiner.*